United States Patent [19]
Eddens et al.

[11] 3,784,137
[45] Jan. 8, 1974

[54] TRANSMISSION LINE CABLE CLAMP
[75] Inventors: Fletcher C. Eddens, Wilmington, N.C.; William P. Corley, Birmingham, Ala.; Jack Ronald Salling, Birmingham, Ala.; Ralph E. McDonald, Birmingham, Ala.
[73] Assignee: Anderson Electric Corporation, Leeds, Ala.
[22] Filed: Dec. 1, 1971
[21] Appl. No.: 203,652

[52] U.S. Cl. ............... 248/63, 24/125 M, 174/40 R
[51] Int. Cl. ............................................. F16l 3/00
[58] Field of Search ............... 248/63; 24/125 R, 24/125 K, 125 L, 125 M, 125 N; 174/40 R; 254/190 R

[56] References Cited
UNITED STATES PATENTS
3,145,016  8/1964  Leithiser .................... 254/190 R X
FOREIGN PATENTS OR APPLICATIONS
636,197  4/1950  Great Britain .................... 248/63
1,550,604  11/1968  France ........................... 174/40 R
350,187  6/1931  Great Britain ...................... 248/63

OTHER PUBLICATIONS
C. W. Hudson, Deflections and Statically Indeterminate Stresses, 1911, Pages 37–40.
R. Frisch-Fay, Flexible Bars, 1962, Pages 175–180.
R. J. Woods, Strength and Elasticity of Structural Members, 1918, Pages 180–181.
Sverre Sandberg, "New Suspension Clamp for Transmission Line Conductors," AIEE Miscellaneous Paper 49–287, 9/2/49.

Primary Examiner—Ramon S. Britts
Assistant Examiner—Rodney H. Bonck
Attorney—Harold J. Rathbun et al.

[57] ABSTRACT
An elongate tapered clamp body is designed to flex under load in such a manner as to provide an arcuate support of large radius for a suspended cable. A pair of U-bolts clamp the cable between the clamp body and an upper keeper.

7 Claims, 9 Drawing Figures

PATENTED JAN 8 1973 3,784,137
SHEET 1 OF 2

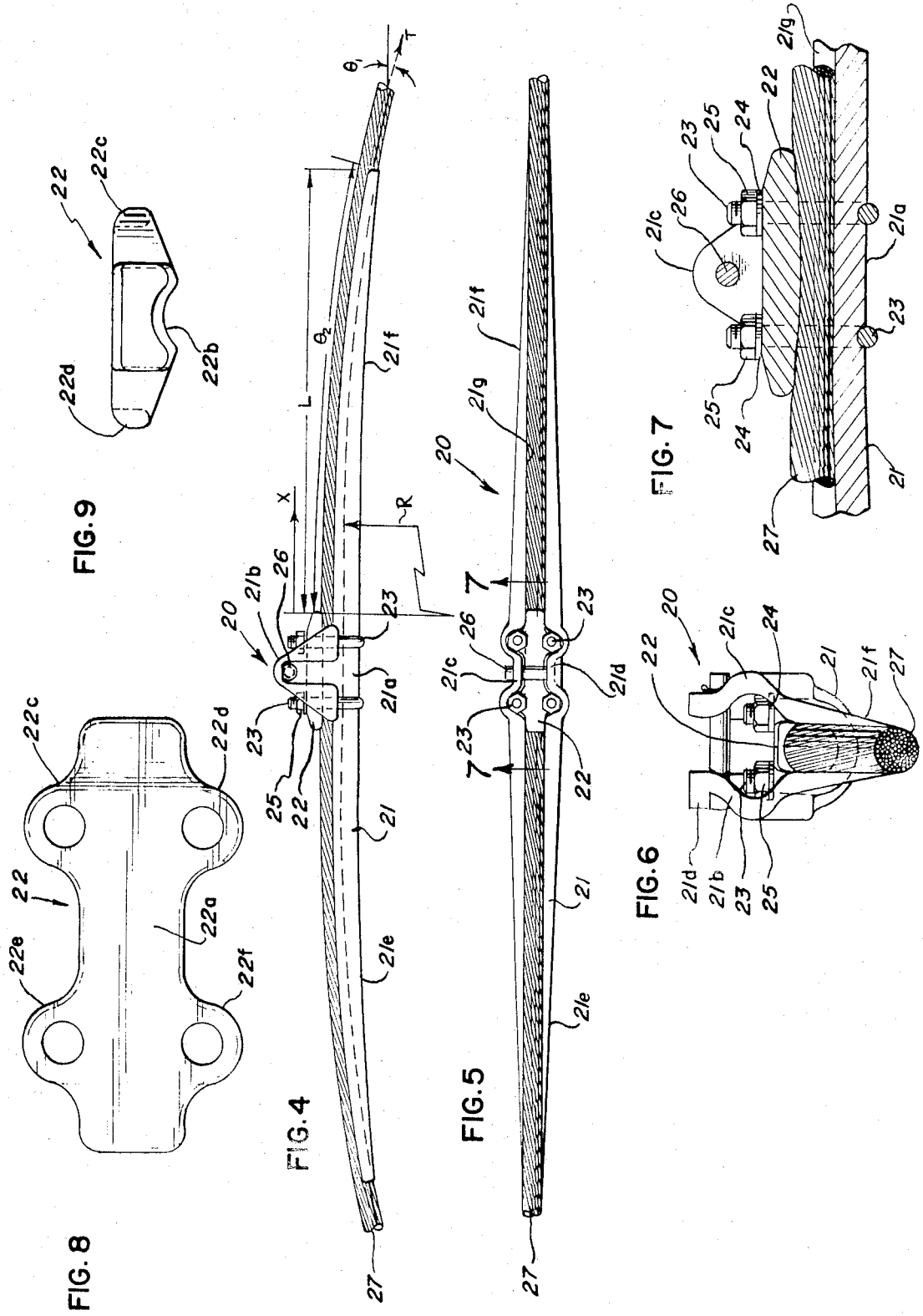

TRANSMISSION LINE CABLE CLAMP

This invention relates generally to cable clamps for suspending electrical power transmission line cables, and more particularly to a cable clamp having an elongate tapered clamp body which flexes under load to provide an arcuate support of large radius for a suspended cable.

The most common cause of broken strands in power transmission line cables is vibration fatigue at a portion of the cable supported by a clamp body. To prevent strand failure by vibration fatigue, the combined stresses in the cable at this point must be kept below the endurance limit of the strand metal. Prior art cable suspension devices have not been satisfactory in this respect.

The combined stresses at the most common point of vibration fatigue failure include static tensile stress parallel to the cable due to the stringing tension, static bending stress where the cable bends over the clamp body, static compressive stress due to the contact pressure between the cable and clamp body, and dynamic stress due to cyclic flexing or aeolian vibration of the cable in a vertical plane at the clamp.

Since there is at present no device available which will completely eliminate aeolian vibrations, and since the trend in the electrical industry toward larger conductors and greater spacing of suspension towers results in higher tensile stresses, the most practical way to substantially eliminate vibration fatigue failure is to reduce the bending and compressive stresses. The bending stress can be reduced by enlarging the radius of an arc over which the cable is bent. The compressive stress can be reduced by increasing the amount of bearing support for the cable.

Most prior art cable clamps have relatively short rigid bodies. In some clamps, additional support for the cable and a certain amount of vibration damping have been provided by wrapping the cable at the clamp in an elongated flexible sheath, or by providing one or more elongated leaf springs underneath the cable. A further refinement has been to provide an elongated flexible clamp body having a central cross section like that of one-half of a hollow cylinder encircling the cable through an arc of substantially 180°, with the amount of encirclement steadily decreasing in successive cross sections from the center to either end of the clamp body.

In accordance with this invention, an elongated flexible clamp body is provided wherein the amount of encirclement of the cable remains the same in successive cross sections, but the outer radius of a cross section steadily decreases in successive cross sections taken progressively closer to the respective ends of the clamp body. Further, the value of the outer radius and the location of its center in successive cross sections are specifically chosen in such a manner as to cause the clamp body to bend under load into an arc of a constant large radius at the cable support surface.

An object of the invention is to provide an improved cable clamp which practically eliminates fatigue failure in the strands of a suspended cable.

Another object is to provide a cable clamp body which, even under severe loads imposed by a suspended cable, supports the cable in a circular arc of a radius significantly larger than the radius of cable supporting surfaces heretofore provided by most prior art cable clamps.

Still another object is to provide a cable clamp including a flexible elongated longitudinally grooved clamp body having successive cross sections generally in the shape of a circular segment with a semicircle cut out therefrom.

A further object is to provide such a clamp body wherein the radii of the semicircles of successive cross sections are equal, and the radii of the circular segments and the distances between the centers of the circular segment radius and the semicircle radius in successive cross sections taken progressively closer to the respective ends of the clamp body steadily decrease.

A still further object is to provide such a clamp body wherein the value and the location of the center of the circular segment radii of successive cross section are specifically chosen in such a manner as to cause the clamp body to bend longitudinally under load into an arc of a constant large radius at the cable support surface defined by the semicircle radii of successive cross sections.

Other objects will appear when the following description is considered along with the accompanying drawings in which:

FIG. 4 is a side elevational view of a cable clamp including a modification of the clamp body of FIG. 1 and a portion of a cable suspended by the clamp;

FIG. 5 is a top view of the cable clamp and cable portion of FIG. 4;

FIG. 6 is an enlarged end elevational view of the cable clamp and cable portion taken from the right of FIG. 4;

FIG. 7 is an enlarged fragmentary longitudinal sectional view taken along the line 7—7 of FIG. 5;

FIG. 8 is a top view of a keeper usable with the clamp body of FIGS. 1 and 2 and also with the clamp body of FIGS. 4 and 5; and FIG. 9 is an end elevational view of the keeper of FIG. 8.

Figure 2:
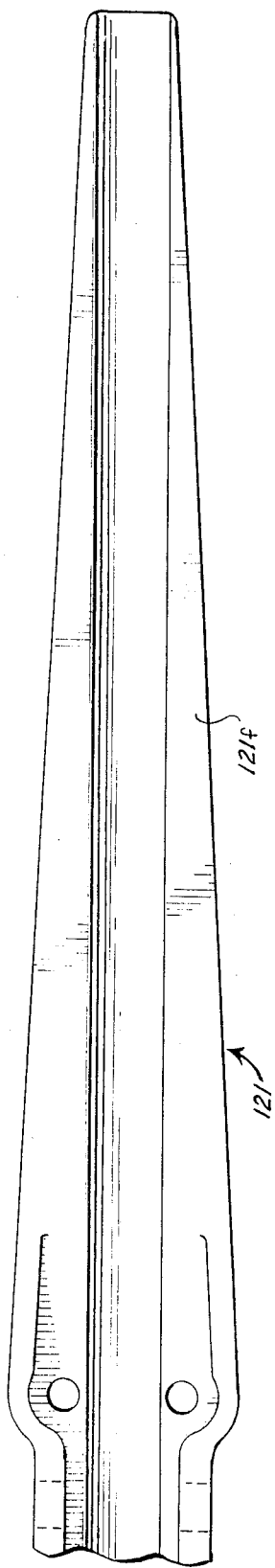
FIG. 2 is a fragmentary top view of the cable clamp body of FIG. 1.

With reference to the drawings, a clamp 20 constructed in accordance with the invention is shown in FIGS. 4, 5 and 6. The clamp 20 includes a clamp body 21 preferably forged of aluminum alloy and designed as hereinafter set forth to flex under load into an arcuate support of large radius for a suspended cable.

The clamp 20 also includes a keeper 22 best shown in FIGS. 8 and 9, a pair of U-bolts 23 each provided with a pair of washers 24 and a pair of nuts 25, and a clevis pin 26 by which the clamp 20 and a cable 27 clamped thereby may be suspended.

A central portion 21a of the clamp body 21 is provided with a pair of grooves and pairs of suitable holes (not shown) for respectively receiving the U-bolts 23. The central portion 21a also has a pair of upstanding ear portions 21b and 21c which are generally triangular in side elevation (FIG. 4) and arcuately flared in top view (FIG. 5) adjacent opposite ends to receive the keeper 22 (FIG. 8). The ear portions 21b and 21c are each provided with a suitable hole (not shown) for receiving the clevis pin 26, and the ear portion 21b may be provided if desired with a flange portion 21d (FIG.

6) at its upper tip. The head of the clevis pin 26 is provided with a flat portion which engages the flange portion 21d to prevent relative rotation.

The keeper 22 (FIGS. 8 and 9) includes a main body portion 22a having a clamping groove 22b on the bottom. The surfaces of the groove 22b may be contoured longitudinally as shown in FIG. 7 and as more fully disclosed in U.S. Pat. No. 3,602,956, issued Sept. 7, 1971, to which reference may be had if desired. The keeper 22 also is provided with two pairs of outwardly offset ear portions 22c, 22d, 22e and 22f each having a suitable hole for receiving a respective portion of one of the U-bolts 23.

In accordance with the invention, the clamp body 21 is provided with a pair of cantilever beam portions 21e and 21f extending oppositely from the central portion 21a. The upper surfaces of the central portion 21a and of the beam portion 21e and 21f are provided with a continuous longitudinal groove 21g for receiving the cable 27. The central portion 21a is substantially rigid and the groove 21g is longitudinally straight therein. The groove 21g is preferably longitudinally curved over a circular arc of large radius in each of the beam portions 21e and 21f in an unstressed condition of the clamp body 21, and under the load of the cable 27, the beam portions 21e and 21f deflect in such a manner as to render the groove 21g therein longitudinally curved in a circular arc of a radius smaller than the initial radius of the unstressed clamp body but still significantly larger than those provided in prior clamp bodies. The method of designing the beam portions 21e and 21f to deflect in the described manner is set forth below.

With reference to FIG. 4, the radius of curvature R of the beam portion 21f is given by $$R = EI/M \quad (1)$$

where $E$ is the modulus of elasticity of the clamp body material, $I$ is the moment of inertia of the cross section of the beam portion 21f, and $M$ is the bending moment.

The bending moment $M$, at any distance $X$ from the fixed end, is given by $$M = W/2 \ (L-X)^2 \quad (2)$$

where $W$ is the distributed load on the beam portion 21f and $L$ is the length of the beam portion 21f.

Substituting for $M$ in equation (1) its equivalent from equation (2) and rearranging gives $$I = RW \ (L-X)^2/2E \quad (3)$$

The distributed load $W$ is given by $$W = T/R \quad (4)$$

where $T$ is the tension in the cable.

Substituting for $W$ in equation (3) its equivalent from equation (4) results in $$I = T \ (L-X)^2/2E \quad (5)$$

Equation (5) is the desired equation defining the necessary moment of inertia of the cross section of the beam portion 21f, at any distance $X$ from the fixed end, to make the beam portion 21f deflect under load into a circular arc. Further, equation (5) applies to any shape of cross section. To complete the design of the beam portion, a shape of cross section is chosen, and the expression for the moment of inertia of the chosen shape is set equal to the right-hand portion of equation (5).

Figure 3:
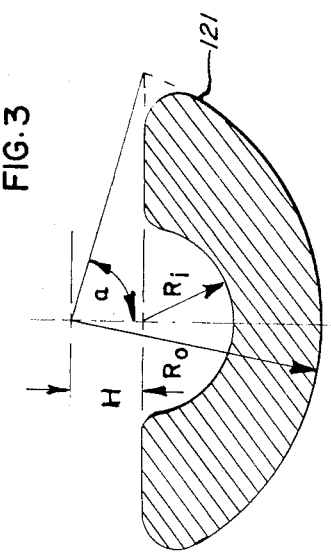
FIG. 3 is an enlarged cross sectional view taken along the line 3—3 of FIG. 1.
Figure 1:
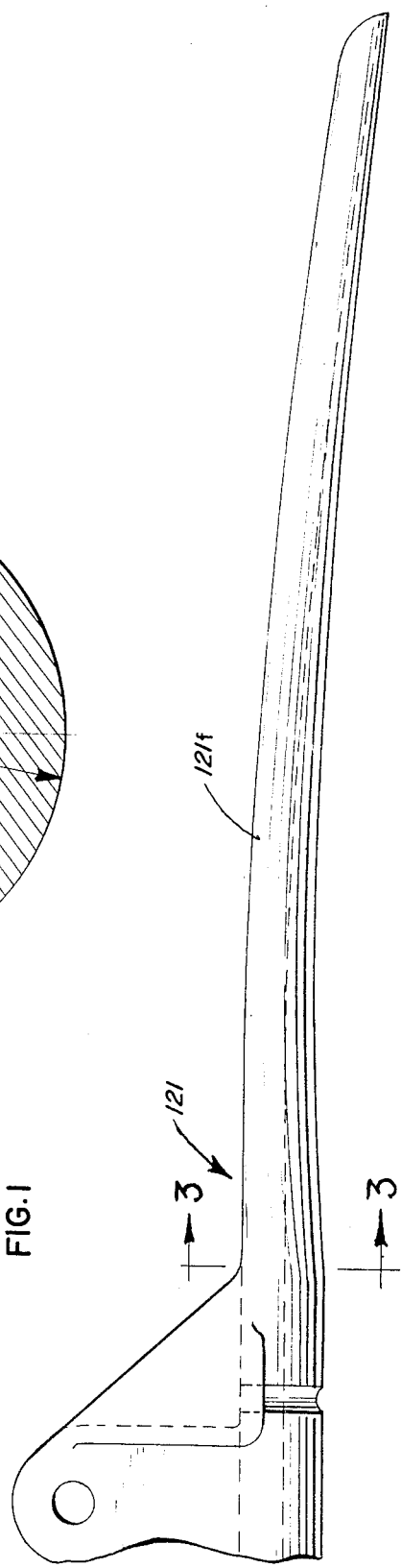
FIG. 1 is a fragmentary side elevational view of a preferred embodiment of a cable clamp body constructed in accordance with the invention.

Preferably, a shape of cross section such as shown in FIG. 3 for a clamp body 121 of FIGS. 1 and 2 is chosen. Neglecting upper rounded portions, this cross section may be considered to be a circular segment with a semicircular cutout. The moment of inertia $I_3$ of such a cross section is derived as follows:

The moment of inertia $I_1$ of a circular segment about an axis through its centroid parallel to the bounding chord is given by $$I_1 = R_o^4 \left[ \frac{1}{8}(2a - \sin 2a)\left(1 + \frac{2\sin^3 a \cos a}{a - \sin a \cos a}\right) - \frac{8}{9}\left(\frac{\sin^6 a}{2a - \sin 2a}\right) \right] \quad (6)$$

where $R_o$ is the radius of the circular segment and "$a$" is one-half the angle subtended by the chord, in radians.

The area $A_1$ of a circular segment is given by $$A_1 = R_o^2/2 \ (2a - \sin 2a) \quad (7)$$

The distance $D_1$ from the bounding chord to the centroid of a circular segment is given by $$D_1 = R_o \left[ (4 \sin^3 a)/6a - 3 \sin 2a) - \cos a \right] \quad (8)$$

The moment of inertia $I_2$ of a semicircle about an axis through its centroid parallel to the bounding diameter is given by $$I_2 = 0.1098 \ R_i^4 \quad (9)$$

where $R_i$ is the radius of the semicircle.

The area $A_2$ of a semicircle is given by $$A_2 = R_i^2/2 \quad (10)$$

The distance $D_2$ from the bounding diameter to the centroid of a semicircle is given by $$D_2 = 0.4244 \ R_i \quad (11)$$

The distance $D_3$ from the bounding chord to the centroid of the resultant area after the semicircle is cut out from the segment is given by $$D_3 = (A_1 D_1 - A_2 D_2)/(A_1 - A_2) \quad (12)$$

where $A_1$, $D_1$, $A_2$ and $D_2$ are as defined in equations (7), (8), (10) and (11), respectively.

The moments of inertia from equations (6) and (9) must be transferred to an axis through the resultant centroid as determined from equation (12). The transferred moments of inertia $I_{31}$ and $I_{32}$ are $$I_{32} = I_1 + A_1 (D_3 - D_1)^2 \tag{13}$$

where $I_1, A_1, D_1$ and $D_3$ are as defined in equations (6), (7), (8) and (12), respectively, and $$I_{32} = I_2 + A_2 (D_3 - D_2)^2 \tag{14}$$

where $I_2, A_2, D_2$ and $D_3$ are as defined in equations (9), (10), (11) and (12), respectively.

The moment of inertia $I_3$ of the resultant area, after the semicircle is cut out from the segment, about its centroid is then given by $$I_3 = I_{31} - I_{32} \tag{15}$$

where $I_{31}$ and $I_{32}$ are as defined in equations (13) and (14).

The moment of inertia $I_3$ from equation (15) is then set equal to the right-hand portion of equation (5), thus defining the necessary moment of inertia of the chosen shape of cross section of a beam portion 121f of the clamp body 121, at any distance $X$ from the fixed end, to make the beam portion 121f deflect under load into a circular arc. This gives $$I_3 = T(L-X)^2/2E \tag{16}$$

The value of the tension $T$ to be substituted in equation (16) is a function of the allowable shear stress. Assuming that a cable to be used has aluminum strands and is reinforced with steel strands, the value of $T$ will depend on the allowable shear stress of the aluminum strands, which has been determined to be 8750 pounds per square inch.

The shear stress $S_s$ is given by $$S_s = (S_b + S_t + S_c)/2 \tag{17}$$

where $S_b$ is the bending stress, $S_t$ is the tensile stress, and $S_c$ is the compressive or bearing stress due to the contact pressure between the cable and clamp body. Since the compressive stress $S_c$ is many times smaller than the bending stress $S_b$ and than the tensile stress $S_t$, it can be neglected, and the shear stress $S_s$ may be expressed as $$S_s = S_b + S_t/2 \tag{18}$$

The bending stress $S_b$ in the aluminum strands is given by $$S_b = E_a d_a/2R \tag{19}$$

where $E_a$ is the modulus of elasticity of aluminum, $d_a$ is the diameter of the aluminum strands, and $R$ is the radius of curvature of the cable or of the clamp body cable support surface.

The tensile stress $S_t$ in the aluminum strands is given by $$S_t = T_a/A_a \tag{20}$$

where $T_a$ is the total tension in the aluminum strands and $A_a$ is the total cross sectional area of the aluminum strands.

The tension $T_a$ is a fraction of the total tension $T$ in the cable and is given by $$T_a = A_a E_a/(A_s E_s + A_a E_a)(T) \tag{21}$$

where $A_a$ and $A_s$ are the total cross sectional areas of the aluminum strands and the steel strands, respectively, and $E_a$ and $E_s$ are the moduli of elasticity for aluminum and steel, respectively.

Substituting for $T_a$ in equation (20) its equivalent from equation (21), substituting for $S_b$ and $S_t$ in equation (18) their equivalents respectively from equations (19) and (20), and rearranging gives $$T = A_s E_s + A_a E_a/E_a [2S_s - E_a d_a/2R] \tag{22}$$

In addition to designing the beam portion 121f to flex under load into an arcuate support of large radius for a suspended cable, it has been found desirable to provide an initial radius of curvature in the support surface groove of the beam portion 121f. The angle of the support surface at the outer end of the beam portion 121f in the unstressed condition of the clamp body can then be made to approximate, while being slightly smaller than, the expected minimum sag angle of the cable, and the cable will take off from the beam portion 121f tangent to the radius of curvature of the support surface. Then if the sag angle increases, the beam portion 121f will not have to flex as much as it would have to if no initial radius of curvature were provided.

It has been experimentally determined that the initial radius of curvature $R$ of a clamp body with the preferred cross section of FIG. 4 should be chosen in accordance with the equation $$R = KD \tag{23}$$

where $D$ is the diameter of the cable and $K$ is a constant substantially within the range of 200 to 280.

Assume that the clamp body 121 is to be designed for a "Rail" cable, which is a cable having a diameter $D$ of 1.165 inches, having 45 aluminum strands of 0.1456 inches diameter $d_a$ and 0.7493 square inches total cross sectional area $A_a$, and having seven steel strands of 0.0971 inches diameter and 0.0518 square inches total cross sectional area $A_s$. For this size cable, a value of $K = 239.345$ has been determined to be an optimum value. Then $$R = 239.345(1.165) = 279 \text{ inches}$$

This value of $R$ can be used in equation (22) along with the previously mentioned allowable shear stress $S_s$ of 8750 pounds per square inch and the above values of $A_a, A_s$ and $d_a$. The moduli of elasticity $E_a$ and $E_s$ are also known, and thus the tension $T$ can be found for substitution in equation (16). The modulus of elasticity $E$ for the material of the clamp body is also known for substitution in equation (16).

The length $L$ of the beam portion 121f to the right of the section line 3—3 in FIG. 1 is given by $$L = R\theta \tag{24}$$

where $R$ is the initial radius of curvature in the unstressed condition of the clamp body and $\theta$ is the angle subtended by the arc. The angle $\theta$ in equation (24) is comparable to the angle $\theta_2$ in FIG. 2. By construction, because the cable is tangent to the radius of curvature, the sag angle $\theta_1$ in FIG. 2 is equal to the subtended angle $\theta_2$.

Assume an initial subtended angle of 4½°(0.0785 radians) in the beam portion 121f of the clamp body. Then $$L = 279 \ (0.0785) = 21.9 \text{ inches}$$

This value of $L$ can be substituted in equation (16).

If the left-hand portion of equation (16) is expanded by substitutions from equations (6) through (15), a very cumbersome expression results in which two of the simplest terms are the right-hand portions of equation (6) and (9). For practical reasons, the value of $R_i$ is chosen to be slightly larger than the radius of the cable. The chosen cable has a diameter of 1.165 inches, as noted above. The cable radius is then 0.5825 inches. A value for $R_i$ of 0.609 inches may be selected.

$R_o$ is the quantity which must be determined at incremental values of $X$ to complete the design of the beam portion 121f. In addition to the value of $R_o$, the distance $H$ of the center of $R_o$ from the center of $R_i$ must also be determined. The distance $H$ is given by $$H = R_o \cos a \tag{25}$$

This equivalent expression for H is present in equation (8). Practical considerations dictate that the distance $H$ should decrease as the radius $R_o$ decreases, in order to maintain reasonable proportions between various parts of particular cross sections and to maintain sufficient thickness at the bottom to support the cable.

Because it is impossible to obtain a solution of equation (16), with $I_3$ expanded, in closed form, a computer is used to determine the values of $R_o$ and $H$ for various values of $X$. The results are given in the following table, along with the thickness $t$ at the bottom of the cross section, all values being in inches:

| X | $R_o$ | H | t |
|---|---|---|---|
| 0 | 1.813 | 0.510 | 0.693 |
| 1 | 1.758 | 0.487 | 0.661 |
| 2 | 1.703 | 0.463 | 0.630 |
| 3 | 1.648 | 0.440 | 0.598 |
| 4 | 1.593 | 0.417 | 0.566 |
| 5 | 1.538 | 0.394 | 0.535 |
| 6 | 1.483 | 0.370 | 0.503 |
| 7 | 1.428 | 0.347 | 0.471 |
| 8 | 1.374 | 0.324 | 0.440 |
| 9 | 1.319 | 0.300 | 0.408 |
| 10 | 1.264 | 0.277 | 0.377 |
| 11 | 1.209 | 0.254 | 0.345 |
| 12 | 1.154 | 0.231 | 0.313 |
| 13 | 1.099 | 0.207 | 0.282 |
| 14 | 1.044 | 0.184 | 0.250 |
| 15 | 0.989 | 0.161 | 0.218 |
| 16 | 0.934 | 0.137 | 0.187 |
| 17 | 0.879 | 0.114 | 0.155 |
| 18 | 0.824 | 0.091 | 0.123 |
| 19 | 0.769 | 0.068 | 0.092 |
| 20 | 0.714 | 0.044 | 0.060 |
| 21 | 0.659 | 0.021 | 0.028 |
| 22 | 0.604 | −0.002 | −0.003 |

Because of the difficulty of forging to knife-edge thinness at the outer end of the beam portion 121f, a practical thickness of about 0.125 inches at the bottom of the cross section should be retained. As can be noted from the table, the thickness $t$ approaches 0.125 at $X$ =18 inches. Therefore, te length $L$ is shortened to 18 inches from the previously determined theoretical length of 21.9 inches. With a 6-inch straight center section, the total length of the clamp body 121 is 42 inches.

Comparative tests indicate that a clamp having a clamp body constructed in accordance with the invention is superior to prior clamps by several orders of magnitude. This is because under all conditions of loading, the cable is supported over a circular arc of comparatively large radius. Consequently the bending stresses are significantly lower, and the resultant shear stress is maintained below the endurance limit of the cable strand metal.

Various modifications may be made in the structure shown and described without departing from the spirit and scope of the invention

We claim:

1. A cable clamp body having a relatively rigid central portion attachable to a supporting structure and a pair of elongated flexible cantilever beam portions extending oppositely from the rigid central portion, the clamp body providing a cable support surface extending across the rigid central portion and along the length of each of the flexible cantilever beam portions, and each of the cantilever beam portions having a cross sectional moment of inertia which increases substantially as the square of the distance from an outer end portion thereof toward the rigid central portion, whereby the cable support surface of each of the cantilever beam portions is longitudinally curved into a circular arc of one radius under one condition of load and longitudinally curved into a circular arc of another radius under another condition of load imposed by a suspended cable.

2. A cable clamp body as claimed in claim 1 wherein the cantilever beam portion is of such a length that a suspended cable is tangent to the respective circular arcs at the junction of the cable and the clamp body.

3. A cable clamp body as claimed in claim 16 wherein each of the cantilever beam portions has a cross sectional moment of inertia $I$, at any distance $X$ from the rigid central portion, determined in accordance with the equation $$I = T/2E \ (L-X)^2$$

where $T$ is the tension in a suspended cable, $E$ is the modulus of elasticity of the material of the clamp body, and $L$ is the length of the cantilever beam portion.

4. A cable clamp body comprising an elongated flexible cantilever beam portion providing a cable support surface and having a cross section progressively decreasing in area in a direction from a fixed end toward a free end of the cantilever beam portion, the cross section being generally in the shape of a circular segment smaller than a semicircle and having a semicircular portion cut out therefrom, the radial center of the cutout semicircular portion being disposed at the center of the chord partially defining the circular segment whereby the cantilever beam portion is thicker in a horizontal direction adjacent the chord than in a vertical direction at the center of the chord, and the radius of the circular segment decreasing in successive cross sections taken progressively away from the fixed end and toward the free end of the cantilever beam portion.

5. A cable clamp body as claimed in claim 4 wherein the distance between the radial center of a bounding arc of the circular segment and the radial center of the cut-out semicircular portion decreases in the successive cross sections.

6. A cable clamp body as claimed in claim 4 wherein the cantilever beam portion in an unstressed condition is provided with an initial longitudinal circular curvature, the radius $R$ of the curvature at the cable support surface being given by the equation $$R = KD$$

where $K$ is a constant and $D$ is the diameter of a cable to be supported on the cable support surface, $D$ being governed by the radius of the cut-out semicircular portion.

7. A cable clamp body as claimed in claim 6 wherein $K$ is substantially in the range of 200 to 280.

* * * * *

UNITED STATES PATENT OFFICE
CERTIFICATE OF CORRECTION

Patent No. 3,784,137     Dated January 8, 1974

Inventor(s) F.C. Eddens, W. P. Corley, J. R. Salling and R.E. McDonald

It is certified that error appears in the above-identified patent and that said Letters Patent are hereby corrected as shown below:

Column 8, line 39, change "16" to --1--

Signed and sealed this 23rd day of April 1974.

(SEAL)
Attest:

EDWARD M. FLETCHER, JR.
Attesting Officer

C. MARSHALL DANN
Commissioner of Patents